United States Patent [19]

Saidi

[11] Patent Number: 5,419,890
[45] Date of Patent: May 30, 1995

[54] USE OF ORGANIC SOLVENTS IN THE SYNTHESIS OF $V_6O_{13+x}[0<X\leq 2.0]$

[75] Inventor: M. Yazid Saidi, San Jose, Calif.

[73] Assignee: Valence Technology, Inc., San Jose, Calif.

[21] Appl. No.: 260,130

[22] Filed: Jun. 14, 1994

Related U.S. Application Data

[63] Continuation-in-part of Ser. No. 184,089, Jan. 19, 1994.

[51] Int. Cl.⁶ .................... C01G 31/02; H01M 4/58
[52] U.S. Cl. ........................ 423/592; 429/218
[58] Field of Search .................... 423/592; 429/218

[56] References Cited

U.S. PATENT DOCUMENTS

| | | | |
|---|---|---|---|
| 2,784,075 | 3/1957 | Bauerle et al. | 423/592 |
| 3,087,786 | 4/1963 | Schoder | 423/592 |
| 3,483,110 | 12/1969 | Rozgonyi | 423/592 |
| 3,728,442 | 4/1973 | Pakhomov et al. | 423/592 |
| 4,039,582 | 8/1977 | Nasyrov et al. | 423/592 |
| 4,119,707 | 10/1978 | Thome et al. | 423/592 |
| 4,952,467 | 8/1990 | Buchel et al. | 429/218 |
| 5,258,245 | 11/1993 | Takata et al. | 423/592 |

*Primary Examiner*—Wayne Langel
*Attorney, Agent, or Firm*—Gerald Swiss

[57] ABSTRACT

A method of making non-stoichiometric vanadium oxides $V_6O_{13+x}$ by treatment with $H_2O_2$ in an organic medium.

7 Claims, No Drawings

USE OF ORGANIC SOLVENTS IN THE SYNTHESIS OF $V_6O_{13+x}[0<X\leq 2.0]$

This application is a continuation-in-part of United States patent application Ser. No. 08/184,089, filed Jan. 19, 1994, pending; entitled "METHOD OF MAKING $V_6O_{13+x}[O(x<x\leq 2.0]$" which application is incorporated herein by reference in its entirety.

FIELD OF THE INVENTION

The present invention provides a method of synthesizing non-stoichiometric solid vanadium oxide $V_6O_{13+x}[0<X\leq 2.0]$. Vanadium oxides are often employed as cathode active materials for use in solid secondary electrochemical cells.

BACKGROUND OF THE INVENTION

Solid state lithium electrochemical cells are known in the art and typically consist of a lithium or lithium-based metal anode, a lithium-ion conducting solid electrolyte, and a cathode containing a lithium ion insertion electrode material. An insertion electrode material is capable as acting as a cathode by virtue of its ability to reversibly accommodate lithium ions physically inserted into its structure during discharge of the cell and subsequently removed therefrom during charging of the cell. Such insertion electrode materials (or intercalation compounds) include $V_2O_5$, $TiS_2$, $V_6O_{13}$, $LiCoO_2$ which have satisfactory specific energy densities of about 300–900 Wh kg$^{-1}$ and mid-discharge voltages of about 2–3 volts.

Like other elements in the transition metal group including niobium and tantalum, vanadium forms numerous and frequently complicated compounds because of its variable valence. The four principle oxidation states of vanadium are 2+, 3+, 4+ and 5+, and it forms derivatives from more or less well defined radicals such as $VO^{2+}$ and $VO^{3+}$. However, the vanadium oxide solids possess nominal stoichiometries which indicate a mixture of vanadium oxidation states is present in certain solid phases of vanadium.

Solid lithium electrochemical cells using $V_6O_{13}$ as the active cathode material are well studied. K. West et al., J. Power Sources, 14 (1985) 235–246, studied $V_6O_{13}$ as a cathode material for lithium cells using polymeric electrolytes. They found that the lithium insertion reaction was reversible in the composition interval $Li_xV_6O_{13}$ [$0\leq x\leq 8$]. The high stoichiometric energy density for the ultimate composition $Li_8V_6O_{13}$, 890 W h/kg, is very favorable for battery applications. P.A. Christian et al., U.S. Pat. No. 4,228,226 suggest that lithiated vanadium oxides of the composition $Li_xVO_{2+y}[0<y\leq 0.4]$ may be prepared chemically by treatment of $VO_{2+y}$ with n-butyllithium in hexane. Christian et at. report that the unit cell parameters derived from X-ray powder diffraction data suggests that the compositions $Li_xV_6O_{13}$ have a structure very similar to that of the monoclinic $V_6O_{13}$ i.e. $VO_{2+y}[0.1<y<0.2]$, prepared at higher temperature. The use of $Li_xVO_{2+y}$, chemically manufactured as aforesaid, as the positive electrode material in a cell, permits the manufacture of cells in the discharged state.

It has been reported in U.S. Pat. No. 4,228,226, the disclosure of which is incorporated herein by reference in its entirety, that vanadium oxides with nominal compositions close to $V_6O_{13}$ i.e. oxides with the nominal stoichiometry range from $VO_{2.05}$ to $VO_{2.2}$ are readily prepared by the thermal decomposition of ammonium vanadate, $NH_4VO_3$, at a controlled rate in an inert atmosphere such as argon or nitrogen, at a temperature of approximately 450° C. Furthermore, the heat treatment of $V_6O_{13}$ prepared in this manner can alter the lithium capacity of the material when used as a cathode active material in solid secondary lithium cells. It has also been observed that the morphology of vanadium oxide solids can affect the lithium capacity of the material under the same circumstances.

D. W. Murphy et at., J. Electrochemical Soc. 128 (1981) 2053, report the synthesis of $V_6O_{13}$ and $V_6O_{13+x}$ [$0<X\leq 0.5$]. Stoichiometric amounts of $V_2O_5$ and vanadium metal powder were intimately mixed and heated to 600° C. in an evacuated quartz tube. The vanadium-oxygen stoichiometry was verified by TGA in an oxygen atmosphere. $V_6O_{13+x}$ [$0<X\leq 0.5$] was produced by ball milling vacuum dried $NH_4VO_3$ and thermally decomposing the ammonium vanadate under an argon stream. The disclosure of D. W. Murphy et al. is incorporated herein by reference in its entirety.

Vanadium oxides $V_3O_7$, $V_4O_9$, $V_6O_{13}$ and $V_6O-+x[0.16\leq X\leq 0.5]$ have been examined by Murphy et al., ibid., as cathode materials in ambient temperature non-aqueous secondary lithium cells. According to Murphy et al., the best cathode materials are $V_6O_{13}$ and a slightly oxygen-rich $V_6O_{13+x}$. Only the latter cathode materials consistently exhibited substantial capacities, good rechargability, and high charge potentials; and therefore made the best candidates for use as cathode active materials in non-aqueous lithium secondary batteries.

A related co-pending application describes the use and method of making $V_6O_{14+x}[0<x\leq 1.0]$, Ser. No. 08/184,087, filed Jan. 19, 1994, as Attorney Docket No. 1325 (028574-322) entitled "A CATHODE ACTIVE MATERIAL $V_6O_{14+x}[0<x\leq 1.0]$, AND SOLID SECONDARY LITHIUM CELLS BASED THEREON" which is incorporated herein by reference in its entirety.

The oxidation of $V_6O_{13}$ in a controlled oxidation atmosphere at high temperature is difficult if the formation of $V_2O_5$ is to be avoided. Oxidation at lower temperatures is preferable but requires the use of an appropriate solvent. Aqueous media can be used but a low boiling organic solvent would make drying the product simpler and be less likely to interfere with the lithium intercalation properties of the product.

It would be advantageous if a low temperature method for making $V_6O_{13+x}$ [$0<X\leq 2.0$] in an organic solvent could be found which provides control over the degree of non-stoichiometry in the product compound, i.e. controls the value of X.

SUMMARY

The present invention improves the morphology of vanadium oxide having nominal stoichiometry close to $V_6O_{13}$ by producing $V_6O_{13+x}$ of particle size about 2 to 5 μm before grinding. It also improves the cycle life and lithium capacity of vanadium oxide cathodes while maintaining a crystalline structure similar to that of $V_6O_{13}$.

In the method of the present invention $V_6O_{13+x}$ [$0<X\leq 2.0$] is prepared from $V_6O_{13}$ in a stirred organic medium contained in a reaction vessel. $V_6O_{13}$ is slowly contacted with at least a nominal stoichiometric amount of hydrogen peroxide for the reaction:

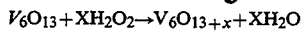

$$V_6O_{13} + XH_2O_2 \rightarrow V_6O_{13+x} + XH_2O$$

to form the product $V_6O_{13+x}$. The hydrogen peroxide is normally added slowly over a period of from about 4 to about 12 hours. In a preferred embodiment, a stream of oxygen is added to the stirred organic medium. Preferably, the reaction vessel and its contents are maintained at a temperature in the range of from about 10° C. to about 65° C. To produce a product $V_6O_{13+x}$ of higher oxygen content, the reaction vessel is sealed to maintain constant volume reaction conditions. The product is a micro-crystalline solid which is filtered, washed and dried before further use.

DETAILED DESCRIPTION OF THE INVENTION

Prior to describing this invention in further detail, the following terms will first be defined.

Definitions

As used herein, the following terms have the following meanings.

The term "stoichiometric" or "stoichiometric compound" refers to a compound where the ratio of the number of atoms to each other, as determined from atomic weight, is a ratio of small, whole numbers. In "non-stoichiometric compounds" there are defects in the crystal lattice or partial replacement of the atoms of one element by those of another. The term "nominal stoichiometry" is used to refer to non-stoichiometric compounds where the ratio of the number of atoms to each other is not a ratio of small whole numbers.

The term "oxidation state" of an element in a compound refers to the difference between the number of electrons associated with an ion in the compound as compared with the number of electrons associated with the neutral atom of the element. In "oxidation" the oxidation state of an atom is increased. One way to perform oxidation is to increase the proportion of oxygen in the compound.

The term "hydrogen peroxide", $H_2O_2$, refers to a colorless, syrupy liquid prepared by several well known methods. Hydrogen peroxide is soluble in water and the aqueous concentration is often expressed as the volume of $O_2$ that can be liberated e.g. 100 vol. hydrogen peroxide is 30.36% (by vol.) $H_2O_2$ or 27.52% (by wt) $H_2O_2$.

The term "organic medium" as used herein refers to an organic solvent and an organic carrier of dispersed particles. That is, a solvent whose principal atomic constituents are carbon and hydrogen. The solvent is preferably a polar solvent boiling below about 80° C. Polar solvents are those containing at least one hetero atom, such as oxygen and nitrogen. It is required that the solvent be miscible, nonreactive and compatible with hydrogen peroxide. Preferably, the solvent is easily removed from the product by ordinary drying procedures.

The term "electrochemical cell" or "electrolytic cell" refers to a composite structure containing a positive electrode, a negative electrode and a ion-conducting electrolyte interposed therebetween.

The term "capacity" or "discharge capacity" of the cell refers to the total amount of charge the fully charged battery can discharge to a certain final cell voltage. It is measured in ampere-hours. It is a measure of the useful charge in the battery. The initial capacity is that measured during the first full cycle of the cell. A comparison of the average cycle capacity to that of the initial cycle provides a measure of how well the cell maintains a constant capacity over repeated cycles.

The term "cycle" refers to a consecutive charge/discharge cycle. The ability of the cell or battery to maintain a useful capacity for many cycles indicates the useful life of the cell or battery.

The terms "solid, single-phase polymeric electrolyte" and "solid polymeric electrolyte" refer to an ionically conducting polymeric solid, normally comprising an inorganic salt, a compatible electrolyte solvent, and a solid polymeric matrix.

The term "solid polymeric matrix", as used herein, refers to a polymer made by polymerizing or copolymerizing monomer(s) or prepolymer(s) or oligomer(s). Certain solid polymeric matrices are useful in the preparation of solid polymeric electrolytes, are well known in the art, and are described, for example, in U.S. Pat. Nos. 4,908,283 and 4,925,751, both of which are incorporated herein by reference in their entirety.

The term, "a solid polymeric matrix forming monomer or polymer precursor" refers to inorganic or organic materials which in monomeric, oligomeric or polymeric form can be polymerized, or further polymerized, as by cross-linking, preferably in the presence of a salt and a solvent, to form solid polymeric matrices which are suitable for use in solid polymeric electrolytes in electrochemical cells. Typically, the solid polymeric matrix forming monomer or polymer precursor has at least one heteroatom capable of forming donor-acceptor bonds with inorganic cations, e.g. alkali ions.

The term "compatible electrolyte solvent", or in the context of components of the solid electrolyte, just "solvent", refers to a low molecular weight organic plasticizer added to the electrolyte and/or the cathode composition, which may also serve the purpose of solubilizing the inorganic ion salt. The solvent is any compatible, relatively non-volatile, aprotic, relatively polar, solvent. Preferably, these materials have boiling points greater than about 80° C. to simplify manufacture and increase the shelf life of the electrolyte/battery. Typical examples of solvent are mixtures of such materials as propylene carbonate, ethylene carbonate, gamma-butyrolactone, tetrahydrofuran, glyme, diglyme, triglyme, tetraglyme, dimethylsulfoxide, dioxolane, sulfolane, and the like. A particularly preferred solvent is disclosed in U.S. Patent Application Ser. No. 07/918,438, filed Jul. 22, 1992, which application is incorporated herein by reference in its entirety.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO^-_4$, $BF^-_4$, $PF^-_6$, $AsF^+_6$, $CF_3COO^+$, $CF_3SO^-_3$, and the like. Specific examples of suitable inorganic ion salts include $LiClO_4$, LiI LiSCN, $LiBF_4$, $LiAsF_6$, $LiCF_3SO_3$, $LiPF_6$, NaI, NaSCN, KI, and the like. The inorganic ion salt preferably contains at least one atom selected from the group consisting of Li, Na and K.

The term "electrochemical cell" refers to a composite structure containing an anode, a cathode, and an ion-conducting electrolyte interposed therebetween.

The "anode" refers to an electrode for the half-cell reaction of oxidation on discharge, which is typically comprised of a compatible anodic material, i.e. any material which functions as an anode in the solid electrochemical cell. Such compatible anodic materials are well known in the art and include, by way of example, lithium, lithium alloys, such as alloys of lithium with aluminum, mercury, iron, zinc and the like, and intercalation-based anodes such as carbon, tungsten oxide and the like.

The "cathode" refers to the counter-electrode to the anode and is typically composed of a compatible cathodic material (i.e. insertion compounds) which is any material which functions as a cathode in an electrochemical cell. Such compatible cathodic materials are well known to the art and include by way of example, manganese oxides, molybdenum oxides, vanadium oxides, such as $V_6O_{13}$, sulfides of molybdenum, titanium and niobium, lithiated cobalt oxides, lithiated manganese oxides, lithiated nickel oxides, chromium oxides, copper oxides, and the like. The particular compatible cathodic material employed is not critical.

METHOD $V_6O_{13}$ has been prepared by the reaction of stoichiometric amounts of $V_2O_5$ and vanadium metal powder intimately mixed and heated to 600° C. in an evacuated quartz tube. After one day, the temperature was increased to 680° C. for 1–3 days. The resulting microcrystalline product was deep purple in color and exhibited a metallic luster (see Murphy et al. ibid). This product typically has an stoichiometric formula of about $V_6O_{12.9}$ to $V_6O_{13.1}$ and is referred to in the art as $V_6O_{13}$.

$V_6O_{13}$ and vanadium oxides with nominal compositions close to $V_6O_{13}$ have been prepared by the thermal decomposition of ammonium vanadate ($NH_4VO_3$) at a controlled rate in an inert atmosphere (such as argon or nitrogen) or in a reducing atmosphere (such as $H_2$, $NH_3$ or $SO_2$) at a temperature of approximately 450° C. (see U.S. Pat. No. 4,228,226). The preparation and analysis of $V_6O_{13}$ powders has also been described by K. West et al., Electrochim. Acta, 28 (1983) 1829, the disclosure of which is incorporated herein by reference in its entirety. The $V_6O_{13}$ used in the examples was obtained from CERAC, Inc., Milwaukee, Wis.

Prior to dispersion of the $V_6O_{13}$ in an organic medium, the $V_6O_{13}$ solid is preferably ground to a fine powder. The powder is dispersed in the reaction vessel containing the organic medium by a rapid stirring means. An aqueous solution of $H_2O_2$ is then added very slowly to the stirred $V_6O_{13}$ which is preferably maintained at a temperature near room temperature. The temperature of the reaction vessel can range from about 10° C. to about 45° C. The concentration of added aqueous $H_2O_2$ is in the range of from about 10% (by vol) to 80% (by vol), preferably from 20% to 60% and most preferably about 30% relative to the organic medium.

A stream of oxygen gas can also be added to the stirred organic reaction mixture during the course of the reaction, i.e. during the 4 to 12 hours it requires to slowly add a nominally stoichiometric amount of $H_2O_2$. To produce a product $V_6O_{13+x}$ of higher oxygen content, the reaction vessel may be sealed to maintain constant volume reaction conditions. The slow addition of $H_2O_2$ to the stirred organic reaction mixture preferably involves the addition of no more than about 5 milligrams of $H_2O_2$ per gram of $V_6O_{13}$ per minute.

The product of the reaction is a micro-crystalline solid which is filtered from the organic medium, washed with distilled water, and dried in a air-blown oven at about 60° C. The micro-crystalline mass may be crushed and the balance of the solvent removed by drying the crushed mass in vacuo.

Analysis is made gravimetrically by weighing the product as the pentoxide. Specifically, TGA (600° C) is used in the reaction $V_6O_{13+x} + (1 - \frac{1}{2}X)O_2 \rightarrow 3V_2O_5$, to determine X by weight increase. X was also determined by potentiometric titration with $KM_nO_4$. The reaction methods of the present invention have been found to provide several means of controlling the non-stoichiometric parameter X in the product $V_6O_{13+x}$. Such means include the rate of addition of $H_2O_2$, the concentration of $H_2O_2$, the addition of $O_2$, the temperature, and the use of a constant volume reaction. In general, to increase the value of X a slower rate of addition of more concentrated $H_2O_2$ is used, $O_2$ is added, the temperature is maintained near room temperature, and a constant volume reaction is used. One or more of these means can be used simultaneously to achieve the stated objective. The following examples are illustrative.

EXAMPLE 1

10 grams of $V_6O_{13}$ were thoroughly dispersed in 12.5 ml of acetone for about 15 minutes using a magnetic stirrer. The speed was such as not to allow the powder to settle down the beaker. Then 10.8 mls of a 30% aqueous solution of $H_2O_2$ was added slowly, typically one drop every few seconds (100–200 μls every 5 seconds). Depending upon the initial composition of the vanadium oxide, the total amount of reactant added contained between about 5–10% excess hydrogen peroxide to drive the reaction to completion. After addition of the $H_2O_2$ was completed, the mixture was stirred for from 4–6 hours. The mixture is dried in an airblown oven at 60° C. to make it easier to crush the powder and to remove the balance of the solvent. The powder is dried in vacuo at a conveniently higher temperature of about 150° C.

EXAMPLE 2

300 grams of $V_6O_{13}$ were thoroughly dispersed in 500 mls of acetone using a high torque mixer (Lightnin L5U8f). The speed was adjusted to 250 rotations per minute. This was sufficient to prevent the mixture from settling down a custom made reaction chamber. Then 69.4 mls of a 30% solution of hydrogen peroxide was slowly added (typically about 100 to 200 μl every 5 seconds). The amount of reactant added contained between 5 to 10% excess peroxide to drive the reaction to completion. After addition of the reactant was completed, the mixture was left to stir for 4 to 6 hours. The mixture was then dried in an airblown oven in the manner described above.

The following prophetic examples further illustrate the methods described herein.

EXAMPLE 3

10 grams of $V_6O_{13}$ is dispersed in 10 ml of acetone for about 10 minutes. 2 ml of $H_2O_2$ (30%, by vol, aqueous solution) is slowly added to the cooled mixture of $V_6O_{13}$ in acetone at a rate of about one drop every ten seconds, while the mixture is continually stirred. After addition of the $H_2O_2$ is completed, the mixture is stirred for from 4–6 hours. The mixture is dried in an airblown oven at 60° C. to make it easier to crush the powder and to remove the balance of the solvent. The powder is dried in vacuo at a conveniently higher temperature of about 150° C.

EXAMPLE 4

As described in Example 3, nominal stoichiometric amounts of $V_6O_{13}$ and $H_2O_2$ (X=1) is mixed in acetonitrile with a stream of oxygen applied at the rate of 25 cc/min for 12 hours. The resulting material is filtered and washed with water, predried at 65° C, and then dried under vacuum at 150° C.

In the examples set forth above, other solvents can be used in place of acetone and acetonitrile as exemplified above merely by substitution. Such other solvents include, by way of example, methanol, tetrahydrofuran, N-methyl pyrollidone, and the like.

It is contemplated that the use of such organic solvents instead of water in these examples will provide benefits insofar as these low boiling solvents can be easily evaporated without applying severe heating conditions. Also, certain low boiling organic solvents can resist oxidation thereby providing some of the same benefits as water. Additionally, such solvents also provide for efficient removal from the final product as compared to water which in most cases ends up tightly adsorbed to the vanadium oxide surface and can only be removed by prolonged heating which can have adverse effects on the final performance of the vanadium oxide.

Utility

The vanadium oxide cathode mixtures described herein are useful in preparing electrochemical cells having improved cumulative capacity and cycle life in comparison to electrochemical cells containing conventional vanadium oxide cathode formulations. Moreover, the subject vanadium oxide cathode mixtures should be particularly useful in preparing solid electrolyte cells having improved cumulative capacity and cycle life in comparison to solid electrolyte cells comprising conventional vanadium oxide cathode compositions.

The following hypothetical example is offered to illustrate the preparation of electrolytic cells using a vanadium oxides prepared in the methods described herein and should not be construed in any way as limiting its scope.

A solid electrolytic cell is prepared by first preparing a cathodic paste which is spread onto a current collector. An electrolyte solution is then placed onto the cathode surface and the cathode paste and electrolyte solution are simultaneously cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio.

The adhesion promoter layer is prepared as a dispersed colloidal solution in one of two methods. The first preparation of this colloidal solution for this example is as follows:

84.4 parts by weight of carbon powder (Shawinigan Black ®—available from Chevron Chemical Company, San Ramon, Calif.)

337.6 parts by weight of a 25 weight percent solution of polyacrylic acid (a reported average molecular weight of about 90,000, commercially available from Aldrich Chemical Company—contains about 84.4 grams polyacrylic acid and 253.2 grams water)

578.0 parts by weight of isopropanol

In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil (about 9 inches wide and about 0.0005 to about 0.001 inches thick). After application, the solvent is evaporated by placing the mixture/foil into a conventional oven. After evaporation, an electrically-conducting adhesion-promoter layer of about 4–6 microns in thickness is formed. The aluminum foil is then cut to about 8 inches wide by removing approximately ½ inch from the sides with a conventional slitter so as to remove any uneven edges; the foil can then be further cut to the desired size.

The second preparation of this colloidal solution comprises mixing 25 lbs of carbon powder (Shawinigan Black ®—available from Chevron Chemical Company, San Ramon, CA) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lighting Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 microns with the occasional 12.5 micron particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, CA) with a 4 inch diameter Jiffy-Mixer brand impeller (such as an impeller available as Catalog No. G-04541-20 from Cole Parmer Instrument Co., Niles, Ill.). Then, it is gear pumped through a 25 microns cloth filter (e.g., So-Clean Filter Systems, American Felt and Filter Company, Newburgh, N.Y.) and coated as described above.

B. The Cathode

The cathode is prepared from a cathodic paste which, in turn, is prepared from a cathode powder as follows:

i. Cathode Powder

The cathode powder is prepared by combining 94.1±1.1 weight percent $V_6O_{13+x}$ [prepared by the methods described herein] and 5.9±1.1 weight percent of carbon (available from AKZO Chemicals, Inc., Chicago, Ill., under the tradename of Ketjen Black EC 600JD ®). About 100 grams of the resulting mixture is placed into a grinding machine (Attritor Model S-1 available from Union Process, Akron, Ohio) and ground for 30 minutes starting at 150 rpm and adjusted to about 250 rpm approximately 10 seconds later and held at that speed for the remainder of the 30 minute duration. Afterwards, the resulting mixture is passed through a 200 mesh screen and then dried in a vacuum or in an inert gas atmosphere (e.g., argon) to produce a cathode powder with a water content of less than about 1000 ppm and preferably less than about 700 ppm.

ii. Cathode Paste

A cathode paste is prepared by combining sufficient cathode powder to provide for a final product having about 53 weight percent $V_6O_{13+x}$. The paste contains the following (in approximate weight percent):

| | |
|---|---|
| $V_6O_{13+x}$ | 53% |
| Carbon | 3.7% |
| 4:1 propylene carbonate/triglyme | 31.9% |
| polyethylene oxide | 2% |
| polyethylene glycol diacrylate | 8% |
| ethoxylated trimethylolpropane triacrylate | 1.4% |

The method of preparing 100 grams of the cathode paste is as follows:

31.9 grams of a solvent having a 4:1 weight ratio of propylene carbonate: triglyme is mixed with 8 grams of polyethylene glycol diacrylate (molecular weight about 400 available as SR-344 from Sartomer Company, Inc., Exton, Pa.) and 1.4 grams of ethoxylated trimethylolpropane triacrylate (TMPEOTA) (molecular weight about 450 and available as SR-454 from Sartomer Co., Inc.) in a double planetary mixer (Ross No. 2 mixer, available from Charles Ross & Sons, Co., Hauppage, NY) to form a solvent solution.

53 grams of $V_6O_{13+x}$, 3.7 grams of carbon, and 2 grams of polyethylene oxide are mixed in a V-blender before being transferred to the double planetary mixer where the blend is stirred at 7.5 Hz and 25° C. (The polyethylene oxide preferably is vacuum dried at 350° C. for three hours prior to use.) The above solvent solution is first passed through 4A molecular sieves and then added to the $V_6O_{13+x}$ and carbon blend under vacuum mixing over a 5 minute period. Afterwards, the mixing speed is increased from 7.5 to 20 Hz and maintained for another 5 minutes. Thereafter, the temperature of the mixture is gradually raised to 85 ° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The resulting cathode paste is maintained at about 45 ° C. until applied onto the current collector. The so-prepared cathode paste can be placed onto the adhesion layer of the current collector by extrusion at a temperature of from about 45° to about 48° C. The extruded cathode past is then spread to a substantially uniform thickness of about 50–120 microns over the current collector by a comma bar.

C. Electrolyte 60.19 grams of propylene carbonate, 15.05 grams of triglyme, and 11.93 grams of urethane acrylate (Actilane SPO23, available from Akcros Chemicals, Ltd., Manchester, United Kingdom) are combined at room temperature until homogeneous. The resulting solution is optionally passed through a column of 4A molecular sieves to remove water and then mixed at room temperature until homogeneous.

At this point, 3 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent is dissolved. A thermocouple is placed at the edge of the vortex created by the magnetic stirrer to monitor solution temperature. The solution is cooled to a temperature of less than 48° C. and then 9.83 grams of $LiPF_6$ are added to the solution over a 120 minute period while thoroughly mixing to ensure a substantially uniform temperature profile throughout the solution. Cooling is applied as necessary to maintain the temperature of the solution between 45° and 48° C.

In one optional embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 60.19 g | 60.19 |
| Triglyme | 15.05 g | 15.05 |
| Urethane Acrylate | 11.93 g | 11.93 |
| $LiPF_6$ | 9.83 g | 9.83 |
| PEO Film Forming Agent | 3.00 g | 3.00 |
| Total | 100 g | 100 |

[a]weight percent based on the total weight of the electrolyte solution (100 g)

This solution is then degassed to provide for an electrolyte solution wherein little, if any, of the $LiPF_6$ salt decomposes.

Optionally, the above solution which contains the prepolymer, the polyalkylene oxide film forming agent, the electrolytic solvent and the $LiPF_6$ salt, is filtered to remove any solid particles or gels remaining in the solution. One suitable filter device is a sintered stainless steel screen having a pore size between 1 and 50 microns at 100% efficiency.

In the alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C, in the propylene carbonate and triglyme and dry the solution over 4A molecular sieves (Grade 514, 8-12 Mesh from Schoofs Inc., Moraga, CA) and then proceed to step 4.

2. Dry the propylene carbonate and triglyme over 4A molecular sieves (Grade 514, 8-12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowly to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent and is light yellow in color. Optionally, in this step, the mixture is heated to 65° C. to 68° C.

7. Cool the solution produced in step 6 and when the temperature of the solution reaches 40° C., add the LiPF$_6$ salt very slowly making sure that the maximum temperature does not exceed 55° C. and preferably does not exceed about 40° C.

8. After the final addition of the LiPF$_6$ salt, stir for an additional 30 minutes, degas, and let sit overnight and cool.

9. Filter the solution through a sintered stainless steel screen having a pore size between 1 and 50 microns at 100% efficiency.

At all times, the temperature of the solution should be monitored with a thermocouple which should be placed in the vortex formed by the mixer.

Afterwards, the electrolyte mixture is then coated by a slot die coater to a thickness of about 25–50 microns onto the surface of the extruded cathode paste prepared as above. The electrolyte and cathode paste are then simultaneously cured by continuously passing the sheet through an electron beam apparatus (available as a Broad Beam electron beam processor from RPC Industries, Hayward, Calif.) at a voltage of about 250 kV and a current of about 48 mA and at a conveyor speed of 50 ft/minute. After curing, a composite is recovered which contains a solid electrolyte laminated to a solid cathode which is affixed to a current collector.

D. Anode

The anode comprises a sheet of lithium foil (about 50 $\mu$m thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte of the above described electrolyte/cathode composite. Lamination is accomplished by minimal pressure.

What is claimed is:

1. A method for preparing $V_6O_{13+x}[0<X\leq 2.0]$ which method comprises the steps of:
    in a stirred organic medium contained in a reaction vessel, contacting $V_6O_{13}$ with at least a nominal stoichiometric amount of hydrogen peroxide to form the product $V_6O_{13+x}$;
    and drying said product.

2. The method of Claim 1 wherein contacting of $V_6O_{13}$ with hydrogen peroxide is conducted by adding about 5 milligrams of $H_2O_2$ per gram of $V_6O_{13}$ per minute to the stirred organic medium.

3. The method of claim 1 wherein an aqueous solution of $H_2O_2$ is added to said stirred organic medium containing $V_6O_{13}$ over a period of about 4 to about 12 hours.

4. The method of claim 1 wherein a stream of oxygen is added to said stirred organic medium.

5. The method of claim 1 wherein said reaction vessel is maintained at temperature of about 0° C. to about 45° C.

6. The method of claim 1 wherein said reaction vessel is sealed to maintain a constant volume reaction.

7. The method of Claim 1 wherein said organic medium comprises a polar solvent boiling below about 80° C.

* * * * *